Figure 1:
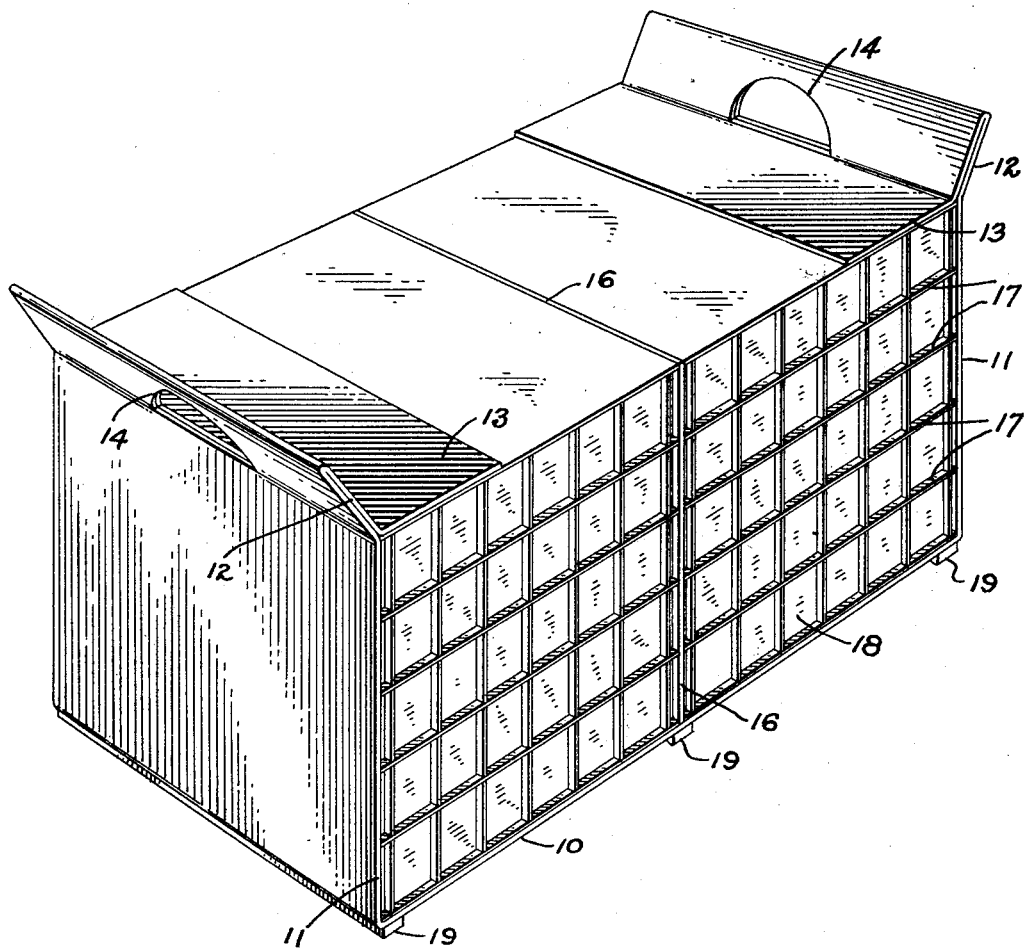

May 16, 1933.  J. R. ROLAND ET AL  1,909,898
EGG CARRIER
Filed Nov. 14, 1930  2 Sheets-Sheet 1

INVENTOR.
Jack R. Roland.
Harry J. Trauner.
BY
Townsend, Loftus & Abbett
ATTORNEYS.

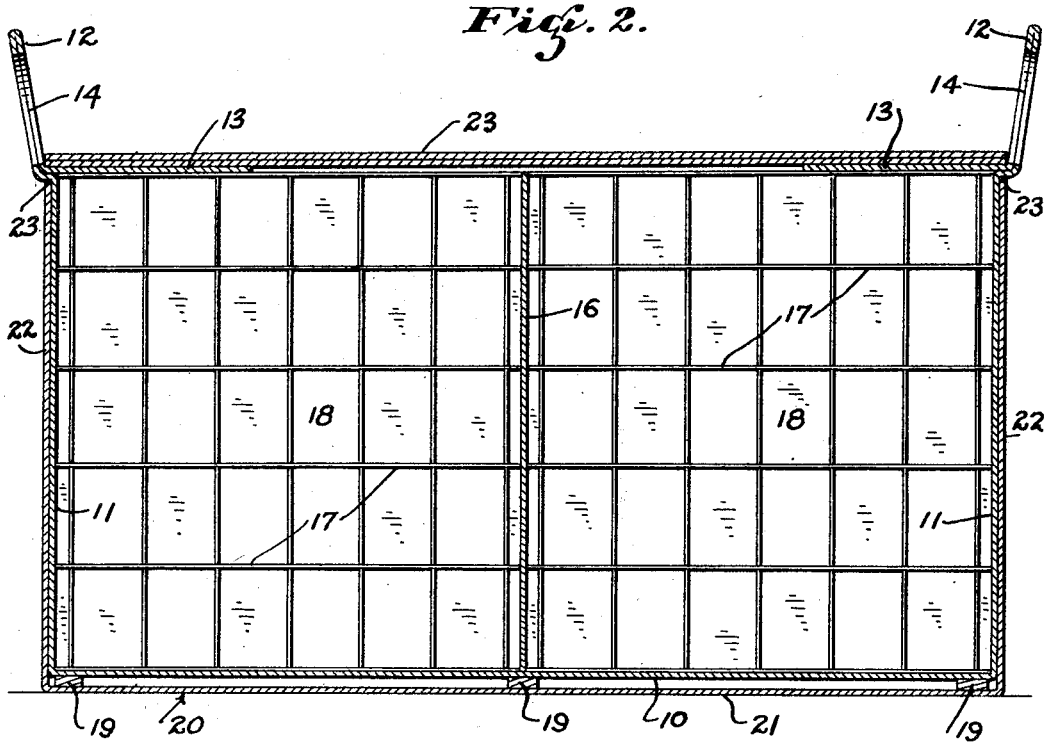
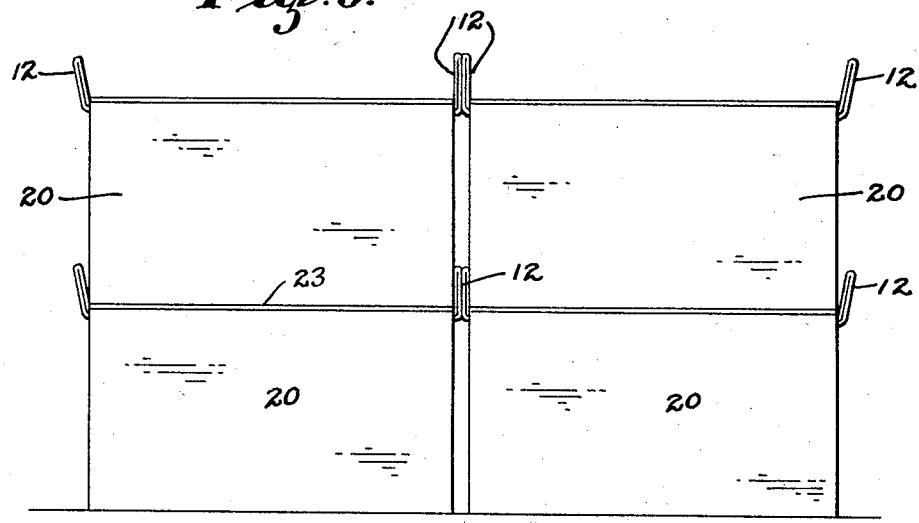

Patented May 16, 1933

1,909,898

UNITED STATES PATENT OFFICE

JACK R. ROLAND AND HARRY J. TRAUNER, OF SAN FRANCISCO, CALIFORNIA, ASSIGNORS TO ILLINOIS PACIFIC COAST COMPANY, OF SAN FRANCISCO, CALIFORNIA, A CORPORATION OF DELAWARE

EGG CARRIER

Application filed November 14, 1930. Serial No. 495,627.

This invention pertains to egg carriers and more particularly to a novel means for packing, storing and shipping eggs or other objects of fragile or perishable nature.

It is the object of the present invention to provide means for facilitating the handling and shipping of eggs or the like. This object is attained through the provision of a carrier adapted to have eggs arranged in it in the usual fillers, said carrier having handles on it by means of which the carrier together with its entire contents can be inserted in or removed from an egg crate in a single operation. The handles are so positioned as to protrude through openings formed in the crate and serve as a means to handle the crate and also as an aid to maintaining the crates in their proper stacked relation during shipping and handling.

The invention is shown by way of illustration in the accompanying drawings in which—

Fig. 1 is a perspective view of an egg carrier designed in accordance with our invention and shown as filled with eggs, Fig. 2 is a central vertical cross section of a crate with the carrier inserted therein, and Fig. 3 is an elevation of a number of crates stacked together showing the manner in which the handles of the carriers serve to maintain them in spaced relation.

Referring more particularly to the drawings, and especially to Fig. 1, we show an egg carrier which consists of a rectangular shaped piece of cardboard of similar material which is bent so as to form a base member 10 and end members 11 extending upwardly therefrom.

The upper edges of the end members 11 are bent back upon themselves as at 12 and then outwardly at right angles to form flaps 13. The upper portions of the end members 11 together with the bent back portions 12 are provided with apertures 14 forming handles by which the entire carrier may be picked up. The carrier is of such a size and shape as to accommodate the usual egg crate fillers such as are used for supporting eggs within a crate and which consist of a central vertical partition as indicated at 16, a plurality of separating pads, or horizontal partitions 17, and the usual supporting members 18 interposed therebetween in cross relation to form individual cells for supporting the eggs.

The base member 10 is provided with three cleats such as indicated at 19, the purpose of which will be set forth hereinafter.

The entire carrier, when filled with eggs, is adapted to fit snugly within a crate such as is generally indicated at 20 in Fig. 2. The crate may be of any desired construction and may be formed either of wood, pasteboard, or other suitable material. The crate, as usual, is box-shaped, having a bottom portion 21, end portions 22, sides, (not shown) and a top indicated at 23. In the present instance, the crate shown is of pasteboard and the top thereof is in the form of flaps hinged to the sides and adapted to be folded over the contents of the crate. The upper edge of the crate ends 22 is provided with a slot 23 through which the handle members 12 of the carrier are adapted to extend in the manner shown in Fig. 2.

One advantage presented by the novel structure of the carrier is that the eggs may be conveniently placed therein in their proper position for shipping owing to the fact that there are no sides to interfere with the packing.

The cellular fillers are placed in the carrier, one layer at a time, and filled with eggs. When the carrier is filled it is picked up by the handle members 12 and slipped into the crate assuming the position shown in Fig. 2, in which figure it will be noted that the cleats 19 maintain the base 10 of the carrier in a position slightly above the bottom 21 of the crate. The intermediate space provides sufficient room for a spring-like action of the carrier in the event of rough handling so that the eggs therein are protected from the shock that they would receive if the base of the carrier rested against the bottom of the crate.

It will also be seen from Fig. 2 that when the cover member 23 of the crate is in its closed position, the handles 12 extend outwardly from the ends of the crate and serve as a means for handling the entire crate. As the cover 23 is closed down upon the flat flaps 13, it is obvious that additional strength is given to the handle members due to the engagement of the flaps with the cover, thus doubling the thickness of the handle which supports the weight of the crate.

Another salient advantage that is presented by the structure described is in the stacking of the crates. It should be understood that eggs, when shipped by rail, are transported in refrigerator cars, and it is desirable that the crates in which they are shipped be stacked in slightly spaced relation to each other to permit of free circulation of cold air between them. Fig. 3 shows several crates as they are stacked for shipping and shows the manner in which the handles protrude from the ends of the crates and engage each other and prevent the crates from being stacked too closely together.

The handles also serve a useful purpose when the crates are being loaded into or unloaded from cars, which is usually accomplished with hand trucks. Ordinarily the crates are handled in stacks of four or five on hand trucks, and while being so handled the members 12 prevent the top crates from sliding sidewise off of the stack.

It will be understood from the foregoing that the filler members employed in connection with the carrier do not constitute a part of the present invention, but that any conventional type of fillers may be used, and that the crate also may be of any type in which slots may be provided through which the handles of the carrier may extend.

While we have shown a preferred form of our invention, it should be understood that various changes may be resorted to in the construction and arrangement of its several parts without departing from the spirit and scope of the appended claims.

Having thus described our invention, what we claim and desire to secure by Letters Patent, is

1. In combination with a crate and filler members for spacing and supporting articles therein, a carrier adapted to contain said filler members whereby they may be inserted in and removed from said crate as a unit, said carrier having handles formed thereon to extend through suitable apertures formed in the crate whereby the crate may be handled thereby.

2. In combination with a crate having slots formed in its opposite ends, a carrier for supporting the contents of the crate, said carrier having handles adapted to extend through said slots whereby they will serve as handles for the crate when the carrier is in the crate.

3. In combination, a crate, an egg carrier adapted to be inserted in the crate, and handles on the egg carriers adapted to extend outwardly and upwardly from the ends of the crate whereby a second crate stacked upon the first crate will nest between said handles.

4. In combination, a crate, an egg carrier adapted to be inserted in the crate, and handles on the egg carrier adapted to extend outwardly and upwardly from the ends of the crate whereby a second crate stacked upon the first crate will nest between said handles, said handles being so positioned as to cooperate with handles on other crates to maintain an air space between crates stacked end to end.

5. A carrier for supporting objects in a crate, comprising a single piece of material forming a base, upwardly bent portions forming end members, handles formed at the top edges of said end members by bending said material away from the end members and back upon itself, and top flaps bent from the inner ends of said handles.

6. A device of the character described, comprising a crate including side portions, a top portion and end portions of less height than the side portions to provide slots between their upper edges and the top portion, and a filler having handles adapted to extend outwardly through said slots.

7. A device of the character described, comprising a crate including side portions, a top portion and end portions of less height than the side portions to provide slots between their upper edges and top portion and a carrier comprising a single piece of material forming a base, upwardly bent portions forming end members, handles formed at the top edges of said top members by bending material away from the end members and back upon itself, said handles being adapted to extend outwardly through said slots in the crate.

JACK R. ROLAND.
HARRY J. TRAUNER.